(12) United States Patent
Moon et al.

(10) Patent No.: US 9,265,057 B2
(45) Date of Patent: Feb. 16, 2016

(54) APPARATUS AND METHOD FOR OPERATING CENTRALIZED BASE STATION IN MOBILE COMMUNICATION SYSTEM

(75) Inventors: Byoung-Chul Moon, Yongin-si (KR);
Sang-Heon Lee, Seoul (KR);
Young-Sung Kho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 13/349,027

(22) Filed: Jan. 12, 2012

(65) Prior Publication Data

US 2012/0176980 A1    Jul. 12, 2012

(30) Foreign Application Priority Data

Jan. 12, 2011    (KR) .................. 10-2011-0003038

(51) Int. Cl.
*H04W 72/12*    (2009.01)
*H04W 88/08*    (2009.01)

(52) U.S. Cl.
CPC ........ *H04W 72/1226* (2013.01); *H04W 88/085* (2013.01)

(58) Field of Classification Search
CPC .... H04B 7/024; H04B 7/0413; H04B 7/0854; H04J 11/005; H04L 1/0004; H04L 5/0023; H04L 5/0035; H04L 5/0053; H04L 5/0057; H04L 5/006; H04L 5/0091; H04W 16/32; H04W 72/0453
USPC .................. 370/254–350; 709/201–213
See application file for complete search history.

(56) References Cited

U.S. PATENT DOCUMENTS

| | | | |
|---|---|---|---|
| 7,567,539 B2 * | 7/2009 | Fujiwara et al. | 370/338 |
| 8,248,950 B2 * | 8/2012 | Ulupinar et al. | 370/237 |
| 8,442,545 B2 * | 5/2013 | Guey et al. | 455/452.2 |
| 8,462,817 B2 * | 6/2013 | Ketchum et al. | 370/476 |
| 8,731,519 B2 * | 5/2014 | Flynn et al. | 455/410 |
| 8,873,477 B2 * | 10/2014 | Xiao | 370/329 |
| 8,929,347 B2 * | 1/2015 | Dalsgaard et al. | 370/338 |
| 2009/0010198 A1 * | 1/2009 | Boariu et al. | 370/315 |

* cited by examiner

*Primary Examiner* — Ayaz Sheikh
*Assistant Examiner* — Debebe Asefa
(74) *Attorney, Agent, or Firm* — Jefferson IP Law, LLP (57) ABSTRACT

An apparatus and method for operating a centralized Base Station (BS) in a mobile communication system are provided. An operation method of a remote radio unit in a separate type BS of a mobile communication system includes receiving channel state information transmitted by a terminal and transmitting the channel state information to a digital unit, performing scheduling using the channel state information, deciding data to be transmitted based on its own scheduling result and a scheduling result received from the digital unit, and providing the data to be transmitted to a modulator/demodulator (modem).

34 Claims, 9 Drawing Sheets

APPARATUS AND METHOD FOR OPERATING CENTRALIZED BASE STATION IN MOBILE COMMUNICATION SYSTEM

PRIORITY

This application claims the benefit under 35 U.S.C. §119 (a) of a Korean patent application filed in the Korean Intellectual Property Office on Jan. 12, 2011 and assigned Serial No. 10-2011-0003038, the entire disclosure of which is hereby incorporated by reference.

BACKGROUND OF THE INVENTION

1. Field of the Invention

The present invention relates to a mobile communication system. More particularly, the present invention relates to a mobile communication system including a centralized base station.

2. Description of the Related Art

Generally, a Base Station (BS) of a mobile communication system is composed of a radio processor and a digital processor. The digital processor processes digital data generated by the radio processor and processes digital data intended for the radio processor.

However, in a case where the number of users within the service coverage area of the BS is less than a maximum amount serviceable by the BS, the digital processor operates below its maximum available capability. This causes a problem of inefficiency.

Accordingly, there is a need for an apparatus and method for overcoming the aforementioned inefficiency.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for operating a centralized Base Station (BS) in a mobile communication system.

Another aspect of the present invention is to provide an apparatus and method for a centralized BS that addresses a problem concerning a distance between a digital unit and a remote radio unit and reduces a bandwidth required between them in a mobile communication system.

A further aspect of the present invention is to provide an apparatus and method for a centralized BS that makes possible the virtualization of a digital unit by using the digital unit that makes use of an Ethernet in place of a network technology such as Common Public Radio Interface (CPRI) or Open Base Station Architecture Initiative (OBSAI).

The above aspects are achieved by providing an apparatus and method for operating a centralized BS in a mobile communication system.

According to one aspect of the present invention, an operation method of a remote radio unit in a separate type BS of a mobile communication system is provided. The method includes receiving channel state information transmitted by a terminal and transmitting the channel state information to a digital unit, performing scheduling using the channel state information, deciding data to be transmitted based on its own scheduling result and a scheduling result received from the digital unit, and providing the data to be transmitted to a modulator/demodulator (modem).

According to another aspect of the present invention, an operation method of a digital unit in a separate type BS of a mobile communication system is provided. The method includes determining if channel state information of a terminal is received, if the channel state information is received, performing scheduling based on the channel state information, and transmitting the scheduling result to a remote radio unit.

According to a further aspect of the present invention, an apparatus of a remote radio unit in a separate type BS of a mobile communication system is provided. The apparatus includes a local scheduler for receiving channel state information transmitted by a terminal, for transmitting the channel state information to a digital unit, for performing scheduling using the channel state information, for deciding data to be transmitted based on its own scheduling result and the scheduling result received from the digital unit, and for providing the data to be transmitted to a modem.

According to a yet another aspect of the present invention, an apparatus of a digital unit in a separate type BS of a mobile communication system is provided. The apparatus includes a central scheduler for determining if it receives channel state information of a terminal, if receiving the channel state information, for performing scheduling based on the channel state information, and for transmitting the scheduling result to a remote radio unit.

According to a still another aspect of the present invention, an apparatus of a separate type BS of a mobile communication system is provided. The apparatus includes a remote radio unit and a digital unit. The remote radio unit receives channel state information transmitted by a terminal, transmits the channel state information to the digital unit, performs scheduling using the channel state information, decides data to be transmitted based on its own scheduling result and a scheduling result received from the digital unit, and provides the data to be transmitted. The digital unit determines if it receives channel state information of the terminal from the remote radio unit, if receiving the channel state information, performs scheduling based on the channel state information, and transmits the scheduling result to the remote radio unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An apparatus and method for operating a centralized Base Station (BS) in a mobile communication system according to an exemplary embodiment of the present invention are described below.

The present invention relates to an apparatus and method for realizing and operating a centralized Base Station (BS) in a mobile communication system.

Existing voice-centered communication is changing into data-centered communication. A mobile communication technology for data-centered communication employs a new standard such as Worldwide Interoperability for Microwave Access (WiMAX) or Long Term Evolution (LTE) to make effective use of frequency resources. Also, mobile communication networks are taking advantage of BSs that support a smaller cell size. An example of a BS supporting a smaller cell size is a pico/femto cell BS that is installed in a shadow area and/or edge area of a macro cell BS. However, this may result in interference of a neighboring BS. To address the interference, Fractional Frequency Reuse (FFR) is used or technologies such as Coordinated Multi-Point (CoMP), centralized Inter-Cell Interference Coordination (ICIC) and the like are under discussion.

Figure 1:
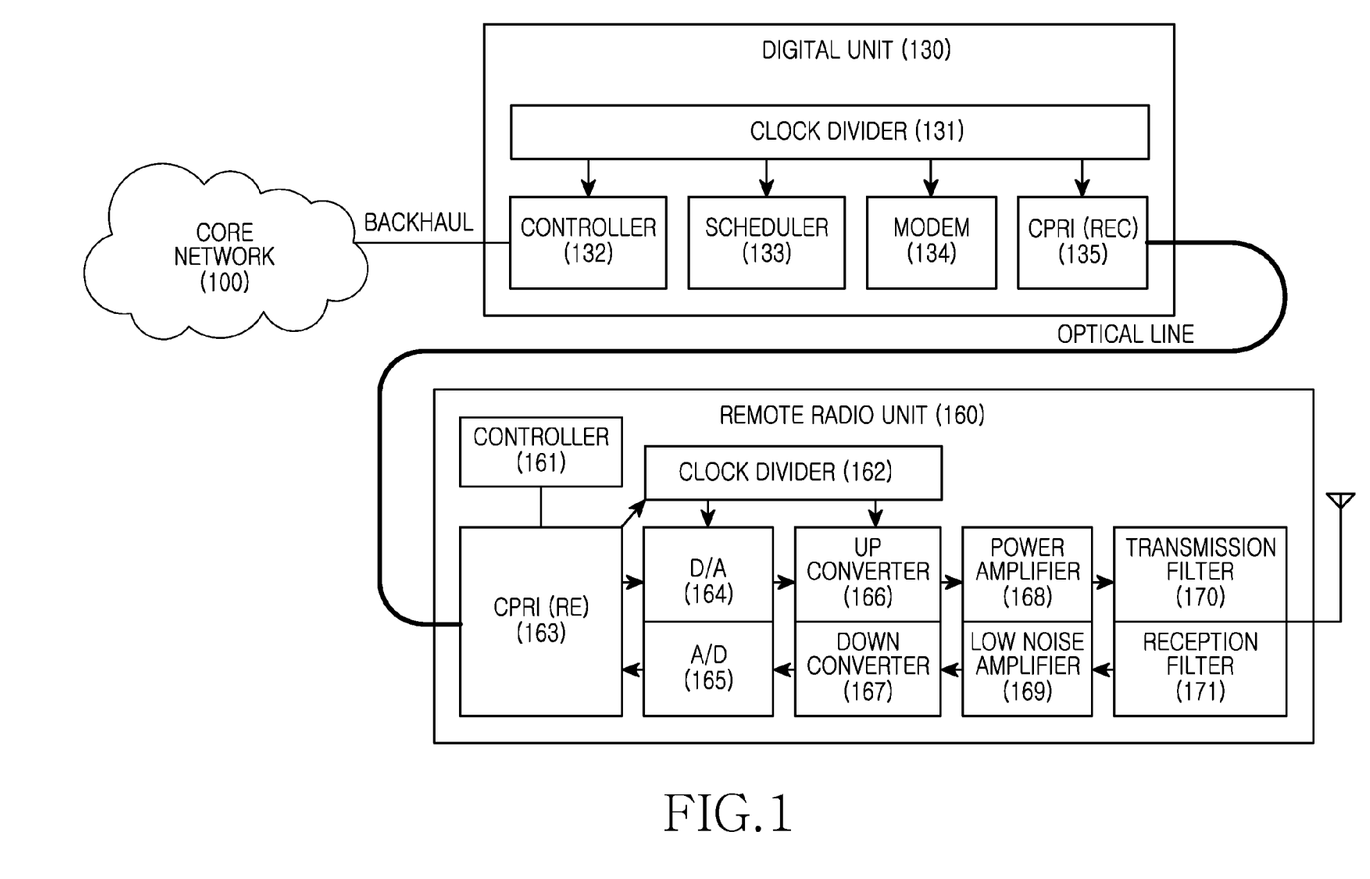
FIG. 1 is a block diagram illustrating a construction of a digital unit and remote radio unit separation type Base Station (BS) according to an exemplary embodiment of the present invention.

FIG. 1 illustrates a construction of a digital unit and remote radio unit separation type BS according to an exemplary embodiment of the present invention.

Referring to FIG. 1, the BS includes a digital unit 130 and a remote radio unit 160.

First, downlink transmission is briefly described below. A controller 132 of the digital unit 130 controls a function of matching with an upper core network 100. A scheduler 133 schedules data received from an upper node in accordance with a channel state and Quality of Service (QoS) of a terminal and forwards the data to a modulator/demodulator (modem) 134. The modem 134 channel codes the data in accordance with the regular standard and forwards the data to a Common Public Radio Interface (CPRI) REC 135. The CPRI REC 135 forwards a baseband signal to the remote radio unit 160 through an optical line. Here, a clock divider 131 supplies a clock to a corresponding module.

A CPRI RE 163 of the remote radio unit 160 receives a baseband signal transmitted by the digital unit 130, and provides the signal to a Digital to Analog (D/A) converter 164. An up converter 166 up converts a converted analog signal in accordance with a corresponding frequency. A power amplifier 168 amplifies the up-converted signal and provides the amplified signal to a transmission filter 170. After that, a filtered signal is transmitted via an antenna. Here, a controller 161 controls the CPRI RE 163.

Uplink transmission operates inversely to the downlink. In more detail, a signal received from a terminal goes through a reception filter 171 and a low noise amplifier 169 and is down converted in a down converter 167 in accordance with a corresponding frequency. After that, the down-converted signal is converted into a digital signal in an Analog to Digital (A/D) converter 165. The digital signal is provided from the CPRI RE 163 to the digital unit 130. Here, a clock divider 162 supplies a clock to a corresponding module.

The digital unit 130 forwards data transmitted by the remote radio unit 160 to a final destination through the upper core network 100. The digital unit 130 and the remote radio unit 160 are connected in a point-to-point form through optic transmission.

A small cell BS brings about increased operating costs such as the leasing a BS installation site of a mobile communication service provider, the relay line installation and maintenance, and the like.

Also, to reduce interference between BSs, the BSs need to transmit/receive information with each other in real-time. For this purpose, the BSs need to share an existing backhaul interface for matching with an upper core network. This is a main cause of restricting a bandwidth. To address this issue, a scheme of gathering and remotely connecting a plurality of digital units of the BS with a remote radio unit can be considered In this case, commonly, CPRI and Open Base Station Architecture Initiative (OBSAI) interfaces are used. Among the interfaces, the CPRI is for time division multiplexing In-phase/Quadrature-phase (IQ) data that is an output of a physical layer processed in the digital unit and data for controlling the remote radio unit, and forwarding the data through an optical line.

A CPRI signal includes a signal for enabling the digital unit and remote radio unit to perform frequency and time synchronization. In a case where an output of the antenna of the BS should be output in accordance with synchronization, a transmission distance between the digital unit and the remote radio unit is restricted. That is, as the digital unit is centralized, the number of digital units is restricted by the distance.

And, in a case where the digital unit is centralized, an interface between the digital unit and the remote radio unit requires many bandwidths. That is, because wirelessly transmitted data is channel coded to make restoration from several available errors possible, this causes an increase of data of 5 to 10 times compared to general data.

For instance, in a case of two 20 Mega Hertz (MHz) transmit antennas in an LTE system, a Media Access Control (MAC) throughput is approximately 150 Mega bits per second (Mbps). The amount of data going through a physical layer of a modem increases and thus, a line rate of 2.4576 Giga bits per second (Gbps) of a CPRI is needed. To address this problem, another exemplary embodiment of the present invention is described in FIG. 2.

Figure 2:
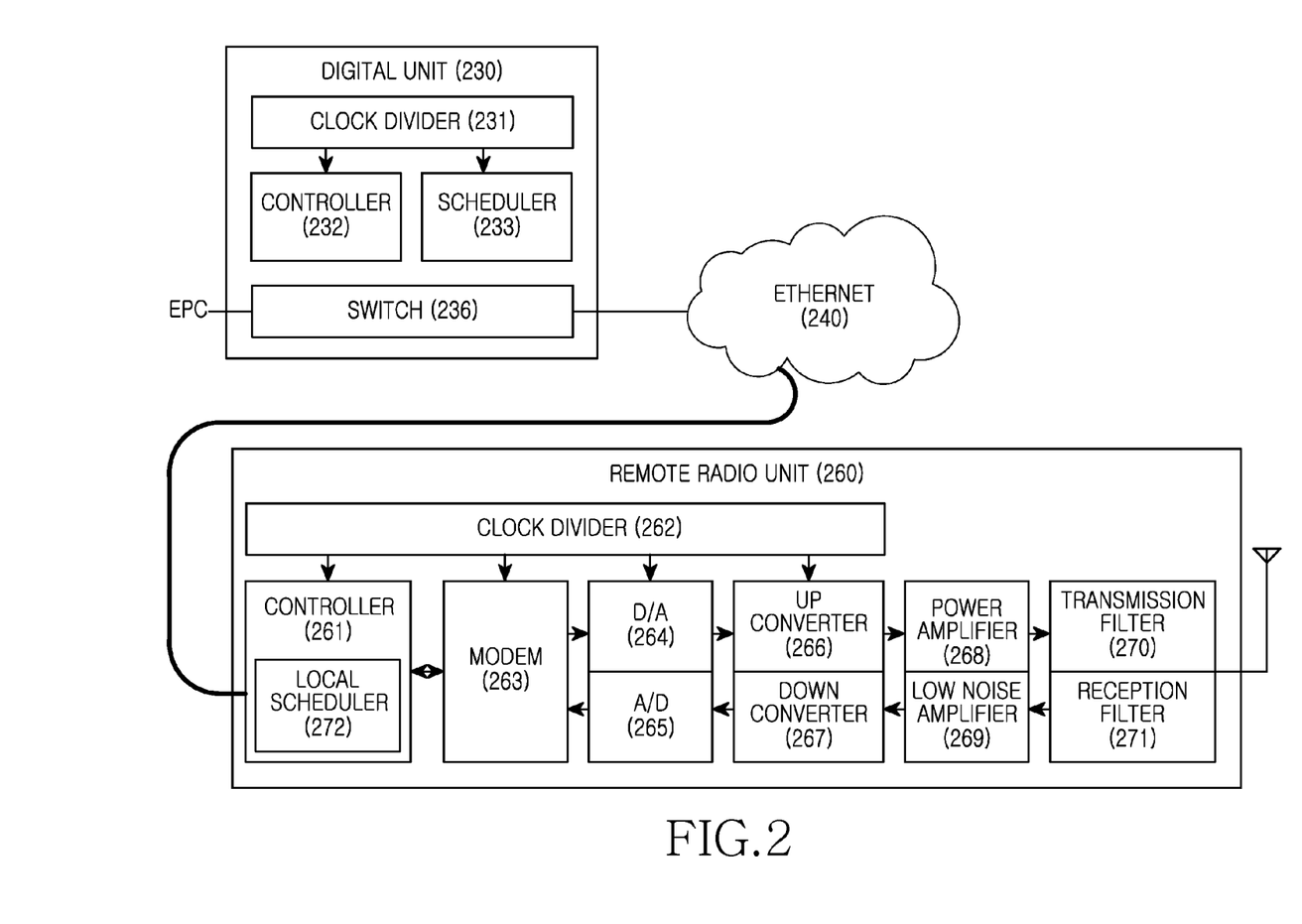
FIG. 2 is a block diagram illustrating a construction of a digital unit and remote radio unit separation type BS according to an exemplary embodiment of the present invention.

FIG. 2 illustrates a construction of a digital unit and remote radio unit separation type BS according to another exemplary embodiment of the present invention.

Referring to FIG. 2, to transmit/receive data and process a message through Ethernet 240, a switch 236 and a controller 261 are installed in a digital unit 230 and a remote radio unit 260, in place of the CPRI interfaces 135 and 163 of FIG. 1, respectively.

In transmission, a modem 263 processes data of a physical layer by coding, modulation and the like. The signal processed in the modem 263 goes through a D/A converter 264, an up converter 266, a power amplifier 268, and a transmission filter 270, and is transmitted to a terminal through an antenna.

In reception, a signal received through the antenna goes through a reception filter 271, a low noise amplifier 269, a down converter 267, and an A/D converter 265 and is provided to the modem 263. The signal goes through the modem 263 for decoding, demodulation and the like. The signal goes through the controller 261 and Ethernet 240 and is forwarded to the digital unit 230.

Also, in order to perform frequency and time synchronization between BSs, clock dividers 231 and 262 are installed and forward a necessary synchronized clock to a corresponding module.

In FIG. 2, functions of a scheduler 233 and a local scheduler 272 are described below. And, a controller 232 and the controller 261 can perform the functions of the schedulers 233 and 272 of the digital unit 230 and remote radio unit 260, respectively. The scheduler 233 is hereinafter called a central scheduler.

The digital unit 230 and the remote radio unit 260 have an Ethernet interface for Ethernet communication. Scheduling methods of the scheduler 233 and local scheduler 272 can be different according to realization circumstances or according to a service provider or manufacturer.

Figure 3:
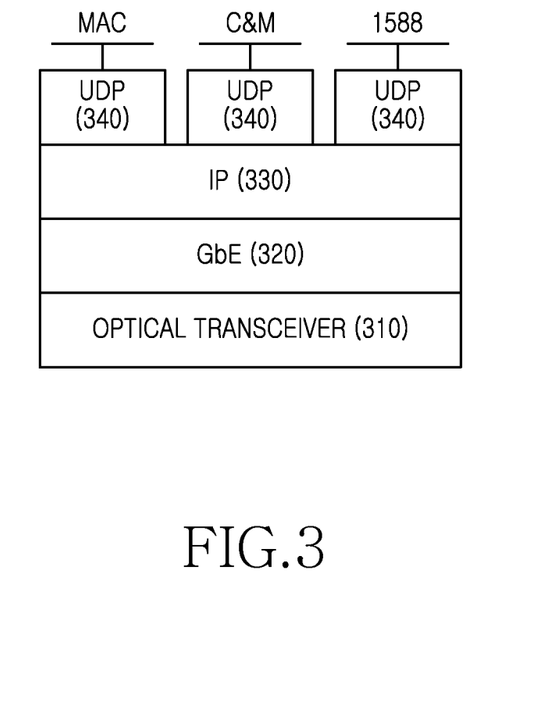
FIG. 3 is a diagram illustrating a construction of an interface between a digital unit and a remote radio unit according to an exemplary embodiment of the present invention.

FIG. 3 illustrates a construction of an interface between a digital unit and a remote radio unit according to an exemplary embodiment of the present invention.

Referring to FIG. 3, an Ethernet link (i.e., a Gigabit Ethernet (GbE)) 320 is stacked on an optical transceiver 310, and an Internet Protocol (IP) 330 is stacked on the GbE 320. User Datagram Protocols (UDPs) 340 are stacked on the IP 330. User data and scheduling information forwarded to the modem 263 are transmitted by means of UDP packets.

Also, the Institute of Electrical and Electronics Engineers (IEEE) 1588 protocol is used for maintaining synchronization between the digital unit and the remote radio unit and thus, the remote radio unit is maintained and managed using UDP packets like Control and Management (C&M) of an existing CPRI.

Figure 4:
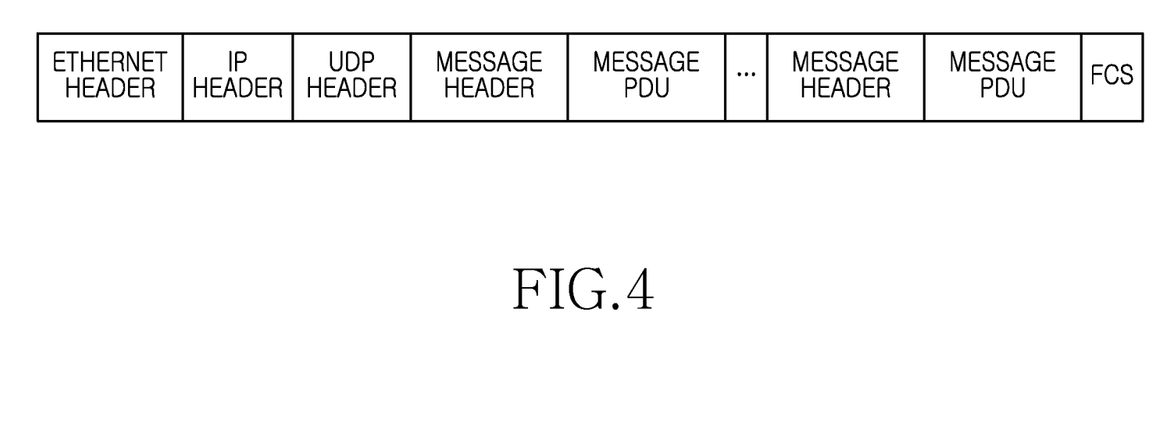
FIG. 4 is a diagram illustrating a message format between a digital unit and a remote radio unit according to an exemplary embodiment of the present invention.

FIG. 4 illustrates a message format between a digital unit and a remote radio unit according to an exemplary embodiment of the present invention.

Referring to FIG. 4, a format of a UDP Packet Data Unit (PDU) for user data and scheduling information forwarded to a modem in a message transmitted/received between the digital unit and the remote radio unit is illustrated.

The type of scheduling message represents the type of information that a controller of the remote radio unit receives from the modem. Here, the information can include, for instance, ACKnowledgement/Non-ACKnowledgement (ACK/NACK), a Channel Quality Indicator (CQI), a Scheduling Request (SR), a Received Signal Strength Indicator (RSSI), a Physical Uplink Shared CHannel (PUSCH), and the like. Even user data resulting from the scheduling result is defined as one message type, and each user data is composed of one PDU. Also, even a message for forwarding the scheduling result of the digital unit to the modem employs the message format.

Since the message format is an Ethernet packet for UDP/IP data, the message format includes an Ethernet header, an IP header, a UDP header, a message header, a message PDU and the like.

Unlike FIG. 1 in which physical layer data is processed in a digital unit, in FIG. 2, the physical layer data is processed in a remote radio unit. So, there is a need to change a scheduling method implemented in the digital unit of FIG. 1. That is, in a scheduling method of FIG. 2, the remote radio unit preferentially performs scheduling requiring real-time processing, and the digital unit performs non-real-time scheduling for improving the performance of the whole cells without a need for real-time processing.

Figure 5:
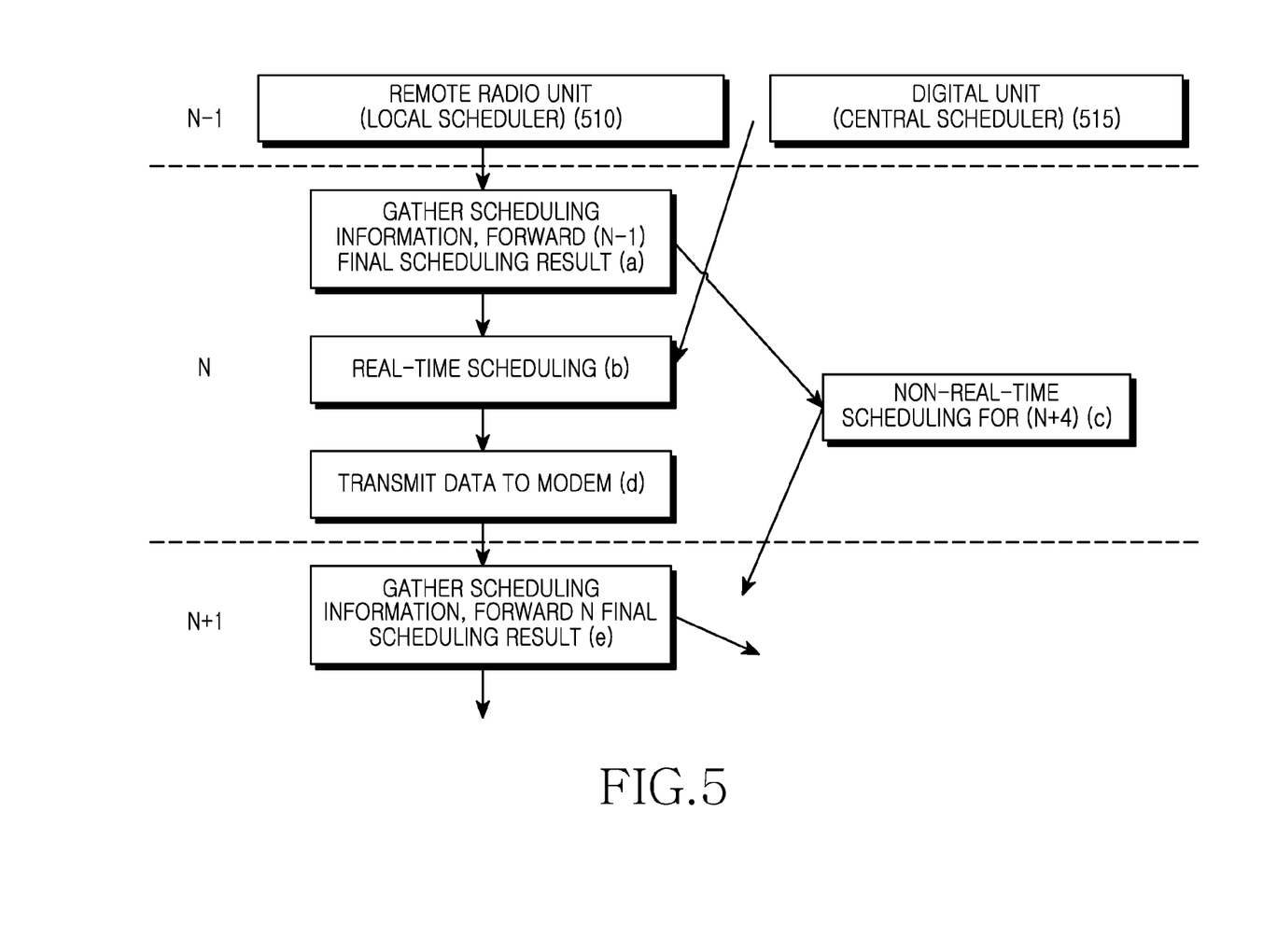
FIG. 5 is a diagram illustrating a scheduling operation between a digital unit and a remote radio unit according to an exemplary embodiment of the present invention.

FIG. 5 illustrates a scheduling operation between a digital unit and a remote radio unit according to an exemplary embodiment of the present invention.

Referring to FIG. 5, scheduling is performed within a specific unitary time. In an exemplary embodiment of the present invention, a scheduling period is set to one millisecond (ms) as in an LTE system.

A local scheduler 510 of the remote radio unit receives information (e.g., CQI, RSSI, SR, and the like) of a physical layer required by a central scheduler 515 of the digital unit, via a modem from a terminal, and provides the received information to the central scheduler 515 of the digital unit in a message format of FIG. 4 in step a. The information of the physical layer can be state information of a channel.

The local scheduler 510 of the remote radio unit performs scheduling to be processed at a corresponding scheduling time (i.e., real-time scheduling) using the information received from the terminal. To comply with a terminal QoS policy and to enhance the performance of the whole cell on the basis of channel information of a terminal of a cell, the local scheduler 510 of the remote radio unit performs scheduling to be processed at a corresponding scheduling time (i.e., real-time scheduling) using the information received from the terminal on the basis of information on scheduling that the central scheduler 515 of the digital unit has previously performed at an (N−4) time slot in step b.

To comply with the terminal QoS policy and to perform the performance of the whole cell on the basis of channel information of a terminal of a cell, the central scheduler 515 of the digital unit performs scheduling for an (N+4) time slot (i.e., non-real-time scheduling) and provides the scheduling result to the local scheduler 510 of the remote radio unit in step c.

In this exemplary embodiment, it is described that a difference of scheduling between the local scheduler 510 and the central scheduler 515 is four unit time slots. But, this can be changed according to the size of the whole cell that the central scheduler 515 takes charge of That is, the local scheduler 510 of the remote radio unit analyzes its own scheduling result and the scheduling result (i.e., information) of the central scheduler 515 of the digital unit provided at the (N–4) time slot, and transmits the final data to the modem in step d.

In this case, the local scheduler 510 can replace and transmit starting from data of low priority among data scheduled by the central scheduler 515.

Regarding data scheduled by the central scheduler 515 but currently not scheduled by the local scheduler 510, corresponding data is again provided to the central scheduler 515 of the digital unit so that the data is again scheduled. After that, the process of step a is repeated in step e.

Figure 6:
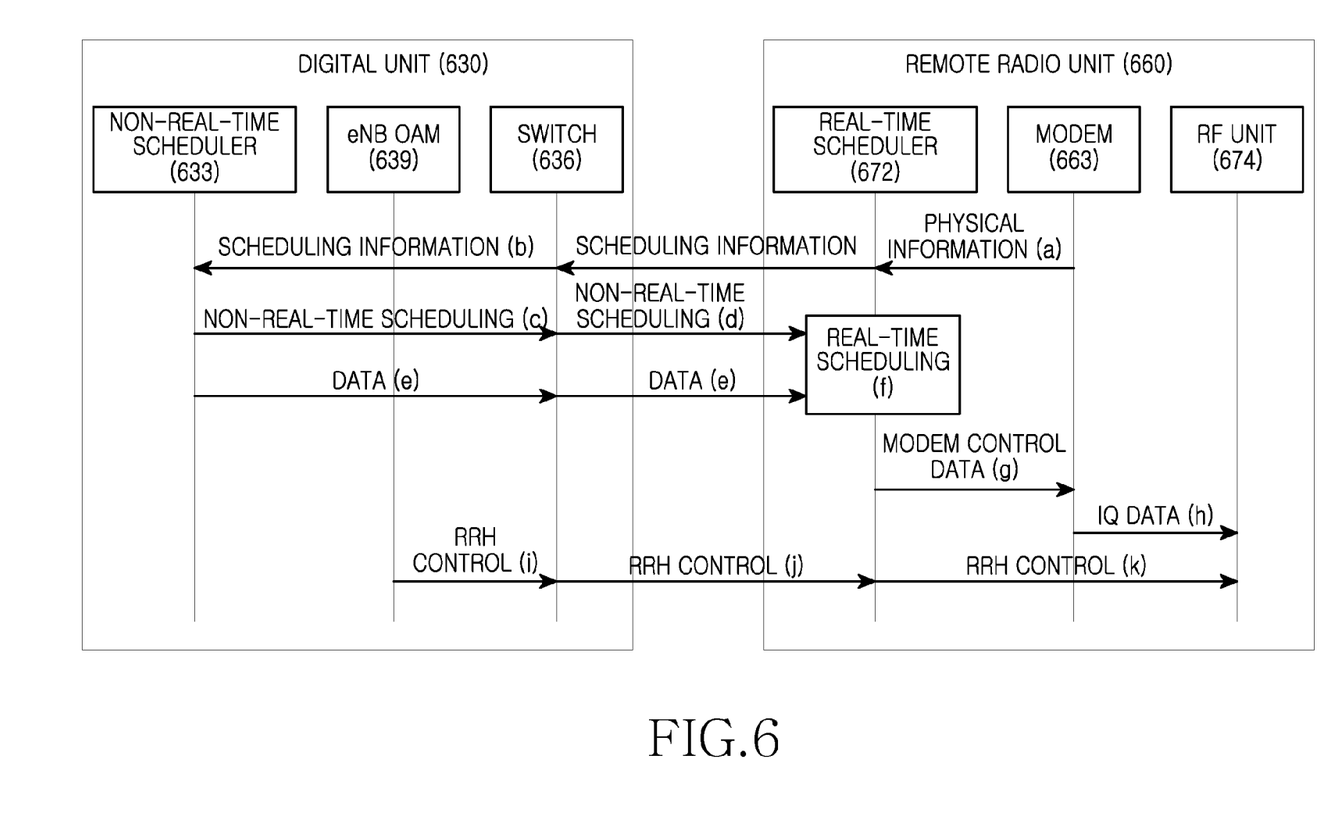
FIG. 6 is a diagram illustrating a message flow between a digital unit and a remote radio unit according to an exemplary embodiment of the present invention.

FIG. 6 illustrates a message flow between a digital unit and a remote radio unit according to an exemplary embodiment of the present invention.

Referring to FIG. 6, scheduling information received from a non-real-time scheduler (i.e., a central scheduler) 633 of a digital unit 630 is stored in a buffer of a modem 663 of a remote radio unit 660. If a real-time scheduler (i.e., a local scheduler) 672 receives a retransmission request from a terminal, the real-time scheduler (i.e., a local scheduler) 672 again transmits corresponding data stored in the buffer, to the terminal.

The real-time scheduler 672 of the remote radio unit 660 receives data necessary for scheduling from the modem 663 in step a, and transmits the data to the non-real-time scheduler 633 using a message of an Ethernet packet presented in FIG. 4.

The Ethernet packet is provided to the non-real-time scheduler 633 of the digital unit 630 via a switch 636 in step b. The non-real-time scheduler 633 performs scheduling to satisfy a QoS of the terminal and improve the performance of the whole cells and provides the scheduling result and data to the real-time scheduler 672 of the remote radio unit 660 in steps c, d, and e.

The real-time scheduler 672 decides the final data to be transmitted on the basis of its own scheduling result and the scheduling result received from the non-real-time scheduler 633 in step f, and controls the modem 633 in step g to provide channel-coded IQ data to a Radio Frequency (RF) unit 674 in step h so that the IQ data is transmitted to the terminal.

At this time, the data forwarded to the modem 663 is temporarily stored in the buffer of the modem 663. If a retransmission request is received from the terminal, corresponding data is again transmitted from the buffer of the modem 663 according to resource allocation of the real-time scheduler 672.

An enhanced Node B (eNB) Operation and Management (OAM) 639 of the digital unit 630 performs a function of operating and managing its own controlling remote radio unit 660. In an existing scheme, information for management is multiplexed to a CPRI and is transmitted/received but, unlike this, in an exemplary implementation of the present invention, the information is directly forwarded to a controller of the remote radio unit 660 via the switch 636 and controls the RF unit 674 through Remote Radio Head (RRH) control in steps i, j, and k.

In the aforementioned exemplary embodiments, in FIG. 1, a remote radio unit and a digital unit extract clock signals through a CPRI and supply necessary clock signals but, unlike this, in FIG. 2, a remote radio unit and a digital unit generate necessary clock signals using the IEEE 1588 standard and forward the clock signals to respective blocks. Due to this, the digital unit does not have a need to determine a distance of the remote radio unit and adjust a data output time point. All blocks of the remote radio unit receive clock signals from a corresponding IEEE 1588 server themselves, so all the blocks can perform frequency synchronization. Also, scheduling is divided into real-time scheduling and non-real-time scheduling and is performed in the remote radio unit and the digital unit, so the scheduling is not affected by a delay occurring in transmission duration.

Figure 7:
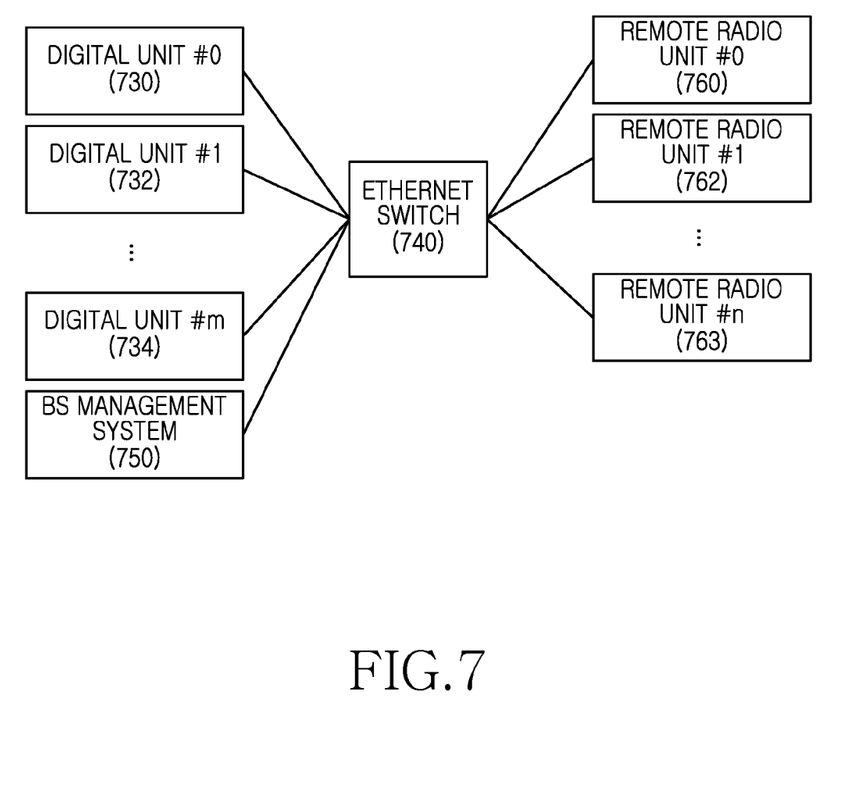
FIG. 7 is a diagram illustrating connections between a plurality of digital units and a plurality of remote radio units according to an exemplary embodiment of the present invention.

FIG. 7 illustrates connection between a plurality of digital units and a plurality of remote radio units according to an exemplary embodiment of the present invention.

Referring to FIG. 7, in managing states of specific digital units 730, 732, and 734, upon failure occurrence, a BS management system 750 switches from a corresponding digital unit to other digital unit.

In exemplary embodiments of the present invention, communication between the digital units 730, 732, and 734 and the remote radio units 760, 762, and 763 is performed using an Ethernet switch 740.

If the switched digital unit transmits data to an IP address of a corresponding remote radio unit, the Ethernet switch 740 performs switching in accordance with the IP address and transmits/receives information between the digital unit and the remote radio unit.

In point-to-point connection using CPRI, a separate device for switching is needed, but a fault-tolerant BS can be constructed using a general switch in another exemplary embodiment of the present invention.

Figure 8:
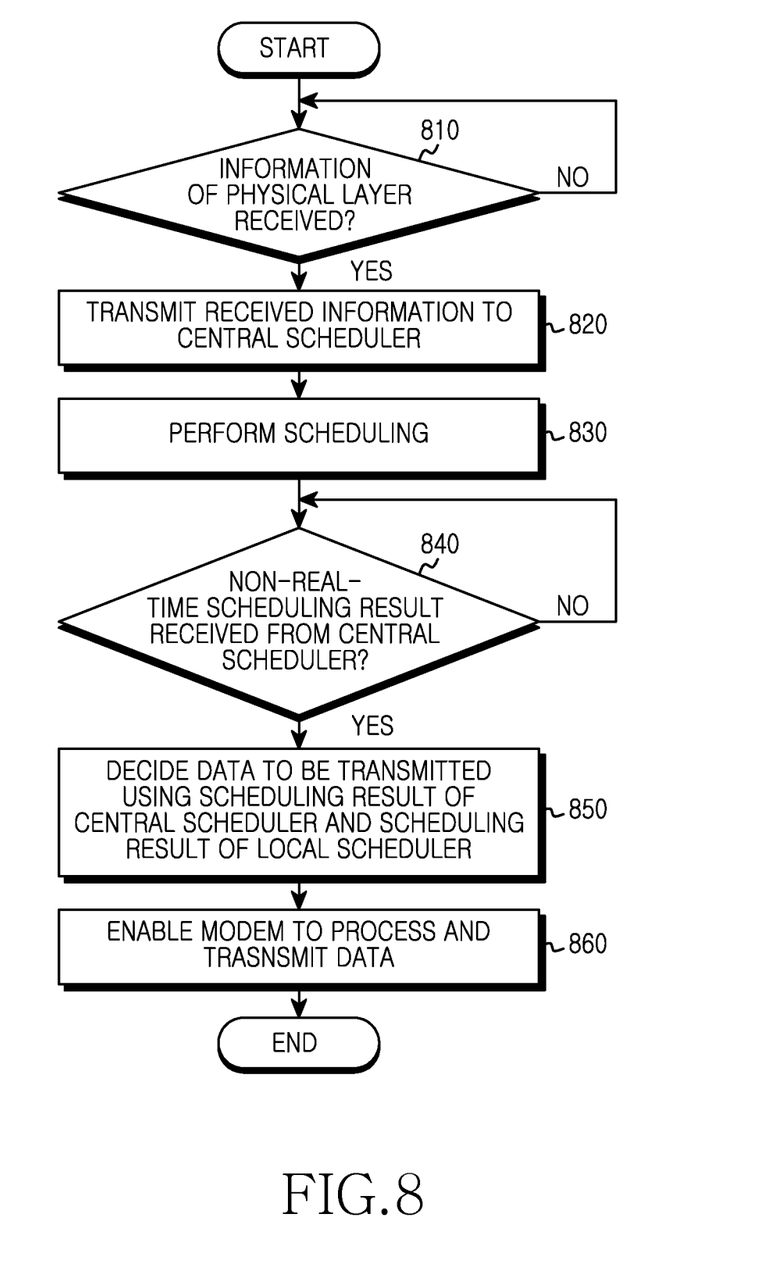
FIG. 8 is a flowchart illustrating an operation process of a remote radio unit according to an exemplary embodiment of the present invention.

FIG. 8 illustrates an operation process of a remote radio unit according to an exemplary embodiment of the present invention.

Referring to FIG. 8, a local scheduler of the remote radio unit determines if it receives information (e.g., CQI, RSSI, and the like) of a physical layer of a terminal, from the terminal in step 810.

If the local scheduler determines in step 810 that it receives physical layer information of the terminal, the local scheduler transmits the received information to a central scheduler of a digital unit in step 820. Ethernet is used for the transmission. According to realization circumstances, power may be included in Ethernet.

The local scheduler performs scheduling based on the information in step 830.

The local scheduler determines if it receives the non-real-time scheduling result from the central scheduler in step 840. If the local scheduler determines that the non-real-time scheduling result is received, the local scheduler decides data to be transmitted using its own scheduling result and the scheduling result of the central scheduler in step 850. The deciding process can be different according to realization circumstances or according to a service provider or manufacturer.

The local scheduler enables a modem to process, by coding, modulation, and the like, the decided data and transmits the data to the terminal in step 860.

Figure 9:
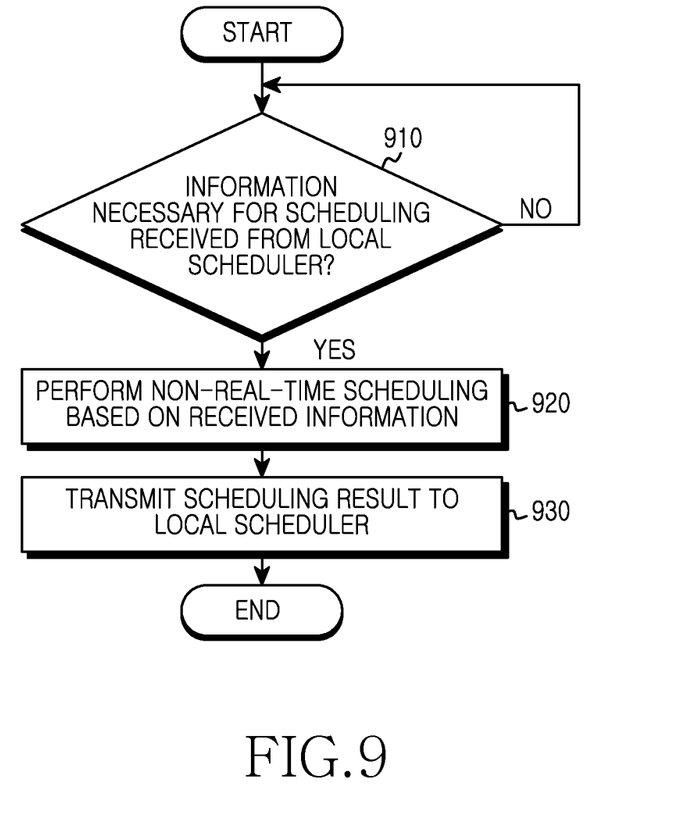
FIG. 9 is a flowchart illustrating an operation process of a digital unit according to an exemplary embodiment of the present invention.

FIG. 9 illustrates an operation process of a digital unit according to an exemplary embodiment of the present invention.

Referring to FIG. 9, a central scheduler of the digital unit determines if it receives information necessary for scheduling from a local scheduler of a remote radio unit in step 910.

If the central scheduler determines in step 910 that it receives the necessary information, the central scheduler performs non-real-time scheduling based on the received information in step 920. The non-real-time scheduling is performed to comply with a terminal QoS policy and to improve the performance of the whole cell.

The central scheduler transmits the scheduling result to the local scheduler in step 930. Ethernet is used for the transmission. And, according to realization circumstances, power may be included in Ethernet.

As described above, exemplary embodiments of the present invention have an advantage of, by positioning a modem of a BS in a remote radio unit, eliminating the restriction of a distance between a digital unit and the remote radio unit. This enables gathering a plurality of digital units in one unit, thus being able to reduce a BS installation area of a service provider. Also, there is an advantage of forwarding not a baseband signal but a MAC PDU between the digital unit and the remote radio unit, thus making connection possible even with a small bandwidth.

Exemplary embodiments of the present invention have an advantage of, because a digital unit and a remote radio unit can connect with each other by a general L2/L3 switch, easily providing dualization or redundancy and enhancing reliability and, because resource pooling of the digital unit is possible, being capable of making effective use of resources. Also, there is an advantage that, in a case where a mobile communication network is built according to the present invention, Power over Ethernet (POE) can be used in a remote radio unit, so installation is easier.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for a digital unit of a Base Station (BS) in a mobile communication system, the apparatus comprising:
   a controller configured to generate at least one packet data unit comprising data to be transmitted;
   a central scheduler configured to perform a first scheduling by cooperating with a local scheduler in a radio unit which performs a second scheduling; and
   an interface unit configured to transmit the at least one packet data unit to a radio unit of the BS via an external network based on the first scheduling,
   wherein the at least one packet data unit is encoded at the radio unit, and
   wherein the encoded at least one packet data unit is transmitted to a terminal based on the first scheduling and the second scheduling.

2. The apparatus of claim 1, wherein the interface unit is further configured to receive a channel state information from the radio unit, to perform the first scheduling based on the channel state information, and to transmit a result of the first scheduling.

3. The apparatus of claim 1,
   wherein the central scheduler is further configured to perform the first scheduling for time slots that are used after a predefined interval.

4. The apparatus of claim 1,
   wherein the central scheduler is further configured to perform the first scheduling based on at least one Quality of Service (QoS) policy and a performance of the whole cell.

5. The apparatus of claim 1,
   wherein the central scheduler is further configured to perform the first scheduling for at least one of a interference, a Fractional Frequency Reuse (FFR), a Coordinated Multi-Point (CoMP) and centralized Inter-Cell Interference Coordination (ICIC).

6. The apparatus of claim 1, wherein the external network comprises an Ethernet.

7. An apparatus for a radio unit of a Base Station (BS) in a mobile communication system, the apparatus comprising:
   an interface unit configured to receive at least one packet data unit from a digital unit of the BS via an external network based on a first scheduling; and
   a local scheduler configured to perform a second scheduling by cooperating with a central scheduler of the digital unit which performs the first scheduling,
   wherein the radio unit is configured to encode the packet data unit received from the digital unit and to transmit the encoded packet data unit to a terminal based on the first scheduling and the second scheduling.

8. The apparatus of claim 7, wherein the interface unit is further configured to transmit a channel state information to the digital unit.

9. The apparatus of claim 8, wherein the interface unit is further configured to receive a result of the first scheduling from the digital unit.

10. The apparatus of claim 7,
    wherein the first scheduling and the second scheduling are performed with a time difference between the first scheduling and the second scheduling.

11. The apparatus of claim 7,
    wherein the local scheduler is further configured to allocate a resource for a retransmission data.

12. The apparatus of claim 7, further
    wherein the local scheduler is further configured to perform the second scheduling to be processed within a predefined interval.

13. The apparatus of claim 7, wherein the external network comprises an Ethernet.

14. The apparatus of claim 13, wherein a power for the radio unit is provided from the Ethernet.

15. A method for operating a digital unit of a Base Station (BS) in a mobile communication system, the method comprising:
    generating at least one packet data unit comprising data to be transmitted; and
    performing a first scheduling by cooperating with a local scheduler in a radio unit which performs a first scheduling;
    transmitting the at least one packet data unit to a radio unit of the BS via an external network based on the first scheduling,
    wherein the at least one packet data unit is encoded at the radio unit, and
    wherein the encoded at least one packet data unit is transmitted to a terminal based on the first scheduling and the second scheduling.

16. The method of claim 15, further comprising:
    receiving a channel state information from the radio unit;
    performing the first scheduling based on the channel state information; and
    transmitting a result of the first scheduling.

17. The method of claim 15, further comprising:
    performing the first scheduling for time slots that are used after a predefined interval.

18. The method of claim 15, further comprising:
    performing the first scheduling based on at least one Quality of Service (QoS) policy and a performance of the whole cell.

19. The method of claim 15, further comprising:
performing the first scheduling for at least one of a interference, a Fractional Frequency Reuse (FFR), a Coordinated Multi-Point (CoMP) and centralized Inter-Cell Interference Coordination (ICIC).

20. The method of claim 15, wherein the external network comprises an Ethernet.

21. A method for operating a radio unit of a Base Station (BS) in a mobile communication system, the method comprising:
receiving at least one packet data unit from a digital unit of the BS via a external network based on a first scheduling;
performing a second scheduling by cooperating with a central scheduler in the digital unit which performs the first scheduling;
encoding the at least one packet data unit received from the digital unit; and
transmitting the encoded packet data unit to a terminal based on the first scheduling and the second scheduling.

22. The method of claim 21, further comprising:
transmitting a channel state information to the digital unit.

23. The method of claim 22, further comprising:
receiving a result of central the first scheduling from the digital unit; and
performing the second scheduling based on the first scheduling.

24. The method of claim 21,
wherein the first scheduling and the second scheduling are performed with a time difference between the first scheduling and the second scheduling.

25. The method of claim 21, further comprising:
allocating resource for a retransmission data.

26. The method of claim 21, further comprising:
performing a scheduling to be processed within a predefined interval.

27. The method of claim 21, wherein the external network comprises an Ethernet.

28. The method of claim 27, wherein a power for the radio unit is provided from the Ethernet.

29. The apparatus of claim 1, wherein the first scheduling and the second scheduling are performed with a time difference between the first scheduling and the second scheduling.

30. The apparatus of claim 1,
wherein the first scheduling is performed in non-real time service, and
wherein the second scheduling is performed in real time service.

31. The apparatus of claim 7,
wherein the first scheduling is performed in non-real time service, and
wherein the second scheduling is performed in real time service.

32. The method of claim 15, wherein the first scheduling and the second scheduling are performed with a time difference between the first scheduling and the second scheduling.

33. The method of claim 15,
wherein the first scheduling is performed in non-real time service, and
wherein the second scheduling is performed in real time service.

34. The method of claim 21,
wherein the first scheduling is performed in non-real time service, and
wherein the second scheduling is performed in real time service.

* * * * *